United States Patent
Furukawa et al.

(10) Patent No.: US 6,388,967 B2
(45) Date of Patent: *May 14, 2002

(54) LIQUID CRYSTAL DRIVING SIGNAL GENERATING APPARATUS AND OPTICAL DISK REPRODUCING APPARATUS WITH LIQUID CRYSTAL DRIVING SIGNAL GENERATING APPARATUS

(75) Inventors: Junichi Furukawa; Kiyoshi Tateishi; Noriaki Murao; Hiroaki Abe, all of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/055,703

(22) Filed: Apr. 7, 1998

(30) Foreign Application Priority Data

Apr. 7, 1997 (JP) ............................... 9-103901

(51) Int. Cl.$^7$ ............................................. G11B 7/135
(52) U.S. Cl. ................. 369/53.19; 369/44.32; 369/112.02
(58) Field of Search .................. 369/44.32, 44.23, 369/54, 58, 112, 53, 19, 12.02

(56) References Cited

U.S. PATENT DOCUMENTS

| | | | | |
|---|---|---|---|---|
| 5,089,812 A | * | 2/1992 | Fuse et al. .................. 340/793 |
| 5,416,757 A | * | 5/1995 | Leucke et al. ............ 369/44.23 |
| 5,534,889 A | * | 7/1996 | Reents et al. ................ 345/132 |
| 5,608,422 A | * | 3/1997 | Ikeda ......................... 345/101 |
| 5,734,637 A | * | 3/1998 | Ootaki et al. ............... 369/112 |
| 5,793,735 A | * | 8/1998 | Oono .................. 369/44.23 X |
| 5,815,233 A | * | 9/1998 | Morokawa et al. ......... 349/200 |
| 5,835,074 A | * | 11/1998 | Didier et al. ................. 345/94 |
| 5,859,818 A | * | 1/1999 | Tateishi et al. .......... 369/44.32 |
| 5,901,131 A | * | 5/1999 | Ootaki et al. ............... 369/112 |
| 5,914,923 A | * | 6/1999 | Araki et al. ............. 369/44.32 |
| 5,936,923 A | * | 8/1999 | Ootaki et al. .................. 369/54 |
| 5,949,748 A | * | 9/1999 | Iwasaki et al. ......... 369/112 X |
| 5,953,002 A | * | 9/1999 | Hirai et al. .................. 345/204 |
| 6,069,620 A | * | 5/2000 | Nakamura et al. .......... 345/214 |
| 6,078,556 A | * | 6/2000 | Furukawa et al. ... 369/44.32 X |
| 6,125,088 A | * | 9/2000 | Ogasawara ............... 369/44.32 |

FOREIGN PATENT DOCUMENTS

JP          9-128785       5/1997       ........... G11B/7/135

* cited by examiner

Primary Examiner—Aristotelis M. Psitos
(74) Attorney, Agent, or Firm—Sughrue Mion, PLLC

(57) ABSTRACT

A liquid crystal driving signal generating apparatus comprises a PWM signal generator, a low pass filter for limiting a frequency band of a PWM signal outputted from the PWM signal generator, a liquid crystal panel connected to an output of the low pass filter, and a control means for controlling the PWM signal generator. The control means controls the PWM signal generator such that the PWM signal generator generates a PWM signal with a duty ratio corresponding to a refractive index to be set in the liquid crystal panel.

51 Claims, 7 Drawing Sheets

LIQUID CRYSTAL DRIVING SIGNAL GENERATING APPARATUS AND OPTICAL DISK REPRODUCING APPARATUS WITH LIQUID CRYSTAL DRIVING SIGNAL GENERATING APPARATUS

BACKGROUND OF THE INVENTION

1. Field of the Invention

The present invention relates to a liquid crystal driving signal generating apparatus for driving liquid crystal and an optical disk reproducing apparatus having the liquid crystal driving signal generating apparatus.

2. Description of the Related Art

In recent years, a digital video disk (DVD) has been proposed as an information recording (reproducing) medium with a large capacity exceeding a compact disk (hereinafter referred to as "CD").

The DVD, which is an optical disk with the same diameter as that of the CD, that is, 12 cm, employs the wavelength of a laser light source of 650 nm which is shorter than that of 780 nm employed in the CD and further employs an objective lens with the numerical aperture of 0.6 which is larger than that of 0.45 employed in the CD.

Further, the DVD employs MPEG2 as the data compression algorithm.

Since the DVD has been improved in this manner as compared with the CD, it is possible to store digital data of about 5 giga byte on one side of a disk.

However, it has been said that a reproducing apparatus for reproducing a DVD, which is a high density medium much more than the CD, requires a control means for controlling the inclination, that is, the tilt angle of the disk surface relative to the optical axis of an optical pickup.

The applicant of the present application has already proposed in Japanese Patent Unexamined Application No. Hei 9-128785 that the aberration of the wave surface caused by the inclination of the disk surface and the variation of the disk thickness is corrected by using a liquid crystal panel.

To be more concrete, this proposal is characterized in that a liquid crystal panel for the aberration correction split into a predetermined configuration is disposed on the optical axis of a laser beam, whereby the aberration of the wave surface caused by the inclination of the disk surface and the variation of the disk thickness is corrected by controlling a refractive index of each of the split portions.

FIG. 8 shows an example of an optical disk reproducing apparatus using such a theory.

In FIG. 8, a laser beam radiated from a laser light source 1 is reflected by a half mirror 2.

The laser beam reflected by the half mirror 2 passes through a liquid crystal panel 3 and applied to an objective lens 4, which in turn forms a laser beam spot on an optical disk 5.

The reflection light reflected by the optical disk 5 passes again the objective lens 4, liquid crystal panel 3 and half mirror 2, and then converged on a photo receptor 7 by a condenser lens 6.

A tilt sensor 8 for detecting the inclination of the optical disk 5 is provided in adjacent to a pickup. The tilt sensor 8 is provided with one light emitting portion and two light receiving portions so that light irradiated from the light emitting portion on the optical disk 5 is reflected thereby and received as reflection light by the respective light receiving portions.

An adder 10 detects a difference between the outputs from the respective light receiving portions and supplies the difference as a tilt error signal to an analog-to-digital (A/D) converter 11.

The tilt error signal is converted into a digital value by the A/D converter 11 and supplied to a central processing unit (CPU) 17.

Upon occurrence of the tilt error, the CPU 17 outputs to a gain adjuster 13 a control signal for correcting the wave surface aberration caused by the tilt error.

An oscillation circuit 12 outputs a reference signal whose duty ratio is set to be 50(%) like a rectangular wave, for example.

The gain adjuster 13 adjusts an amplification degree of the reference signal supplied from the oscillation circuit 12 under the control of the CPU 17.

Thus, a driving signal inputted into the liquid crystal panel 3 is a signal with a duty ratio of 50% whose voltage amplitude is adjusted in accordance with the inclination of the disk.

The liquid crystal panel 3 is formed by sealing liquid crystal between two transparent glass substrates.

FIGS. 9A and 9B are diagrams showing an example of the configuration of the liquid crystal panel 3. FIG. 9B is a cross sectional view of the liquid crystal panel 3, and FIG. 9B is a plan view of the liquid crystal panel 3.

Transparent electrodes 302a, 302b such as indium tin oxide (ITO) electrodes are deposited on the inner surface of transparent glass substrates 301a, 301b.

At least one of the transparent electrodes 302a, 302b has the electrode configuration split longitudinally and latitudinally into electrode portions as shown in FIG. 9B. Each of the electrode portions thus split is connected to corresponding one of the gain adjuster 13 so that voltages applied to the electrode portions are controlled under the control of the CPU 17.

Orientation films 303a, 303b for providing the liquid crystal with predetermined molecule orientation are formed on the inner surfaces of the transparent electrodes 302a, 302b.

Liquid crystal 304 is sealed between the orientation films 303a, 303b. The liquid crystal 304 is liquid crystal having birefringence effect such that a refractive index (n1) of the liquid crystal molecule M to the optical axis direction differs from a refractive index (n2) thereof to the direction opposite to the optical axis direction. Thus, the liquid crystal may be nematic liquid crystal, for example.

FIGS. 11A to 11C are diagrams showing changes in the orientation of liquid crystal when voltage applied to the liquid crystal 304 is changed. FIG. 11A shows the orientation of the liquid crystal molecule M when the voltage applied to the liquid crystal is zero, while FIGS. 11B and 11C show the orientations of the liquid crystal molecule when alternative voltage is applied to the liquid crystal. In this case, the applied voltages are in a relation of e1<e2.

In this manner, the orientation of the liquid crystal molecule M can be controlled from the horizontal direction to the vertical direction by changing the alternative voltage applied thereto.

In FIGS. 11A to 11C, the respective portions of the liquid crystal 304 corresponding to all the split electrode portions are oriented to the same direction since the same control voltage is applied to the respective split electrode portions. However, it is possible to set suitable refractive indexes (n1–n2) for the respective portions of the liquid crystal 304 corresponding to the respective electrode portions by separately controlling the voltage applied to the respective electrode portions split longitudinally and latitudinally.

When the refractive index of the liquid crystal is changed, it is possible to provide a light beam passing through the liquid crystal with an optical path difference given by the following expression.

$$\text{optical path difference} = \Delta n \times d$$

where $\Delta n$ represents a changed value of the refractive index and d represents the thickness of the liquid crystal 304.

This means that the light beam passing through the liquid crystal is provided with a phase difference given by the following expression.

$$\text{phase difference} = \Delta n \times d \times (2\pi/\lambda)$$

where $\lambda$ represents a wavelength of the light beam.

Accordingly, it is possible to correct the wave surface aberration caused by the inclination of the disk by controlling the refractive indexes n of the respective portions of the liquid crystal corresponding to the split electrode portions so as to cancel the aberration caused in the objective lens 4.

In the liquid crystal driving signal generating apparatus for controlling the voltage amplitude of the driving signal, there arises a problem that how the control of the voltage amplitude of the driving signal for driving liquid crystal is realized.

SUMMARY OF THE INVENTION

The present invention has been made in view of the above circumstances, and therefore an object of the present invention is to provide a novel liquid crystal driving signal generating apparatus.

Another object of the present invention is to provide an optical disk reproducing apparatus with such a liquid crystal driving signal generating apparatus.

In order to attain the above object, a liquid crystal driving signal generating apparatus according to the present invention comprises a PWM signal generator, a low pass filter for limiting a frequency band of a PWM signal outputted from the PWM signal generator, a liquid crystal panel connected to an output of the low pass filter, and a control means for controlling the PWM signal generator, and is characterized in that the control means controls the PWM signal generator such that the PWM signal generator generates a PWM signal with a duty ratio corresponding to a refractive index to be set in the liquid crystal panel.

Further, in order to attain the above object, an optical disk reproducing apparatus including a liquid crystal driving signal generating apparatus according to the present invention is characterized by comprising a PWM signal generator, a low pass filter, connected to the liquid crystal panel, for limiting a frequency band of a PWM signal outputted from the PWM signal generator, means for detecting a tilt angle of a disk, and a control means for determining a refractive index to be set in the liquid crystal panel for correcting wave surface aberration caused by the tilt angle, and for controlling the PWM signal generator such that the PWM signal generator generates a PWM signal with a duty ratio corresponding to the refractive index determined.

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments with reference to the accompanying drawings.

Figure 1:
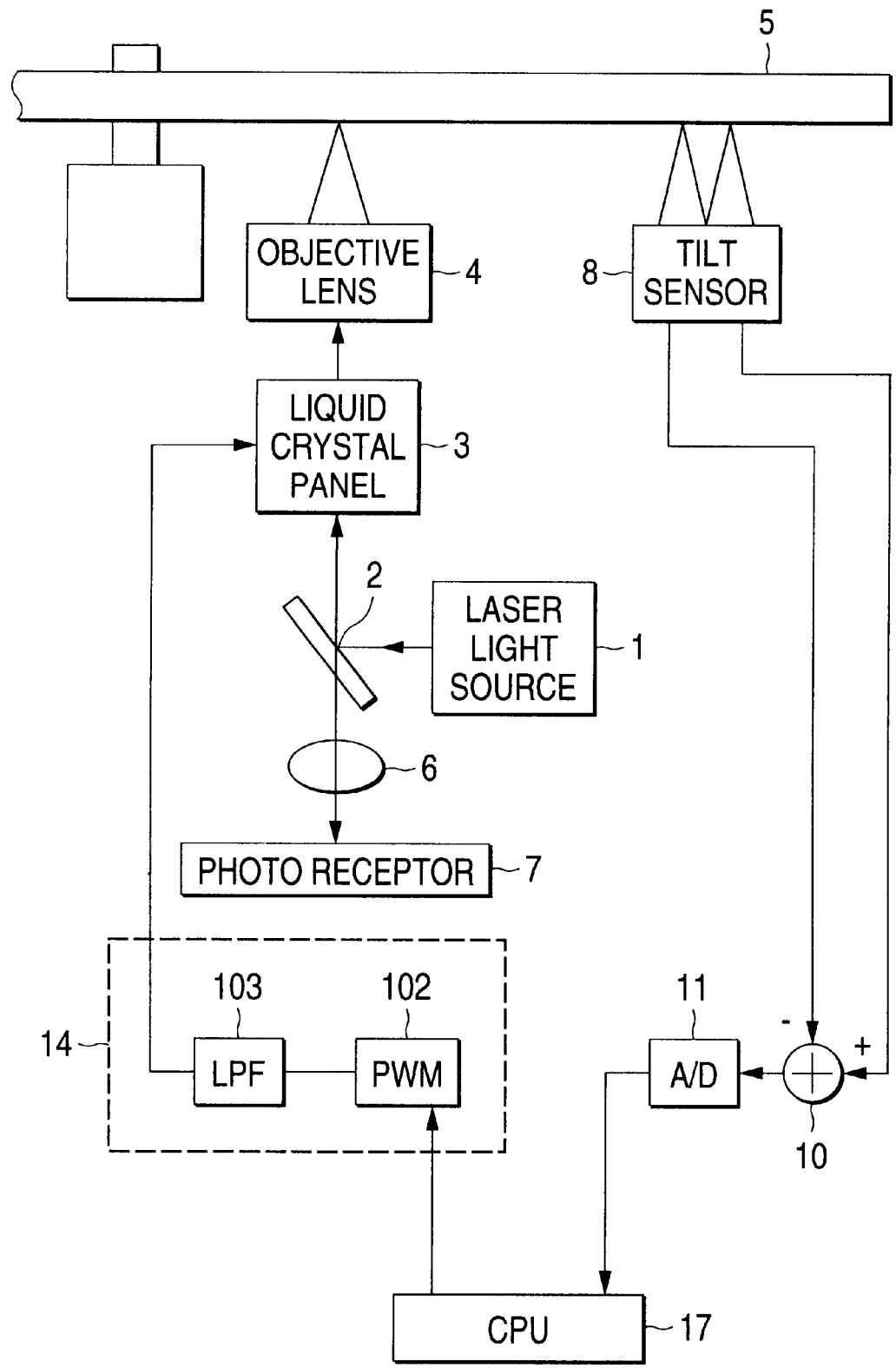
FIG. 1 is a diagram showing the arrangement of an optical disk reproducing apparatus with a liquid crystal driving signal generating apparatus according to the present invention.
Figure 8:
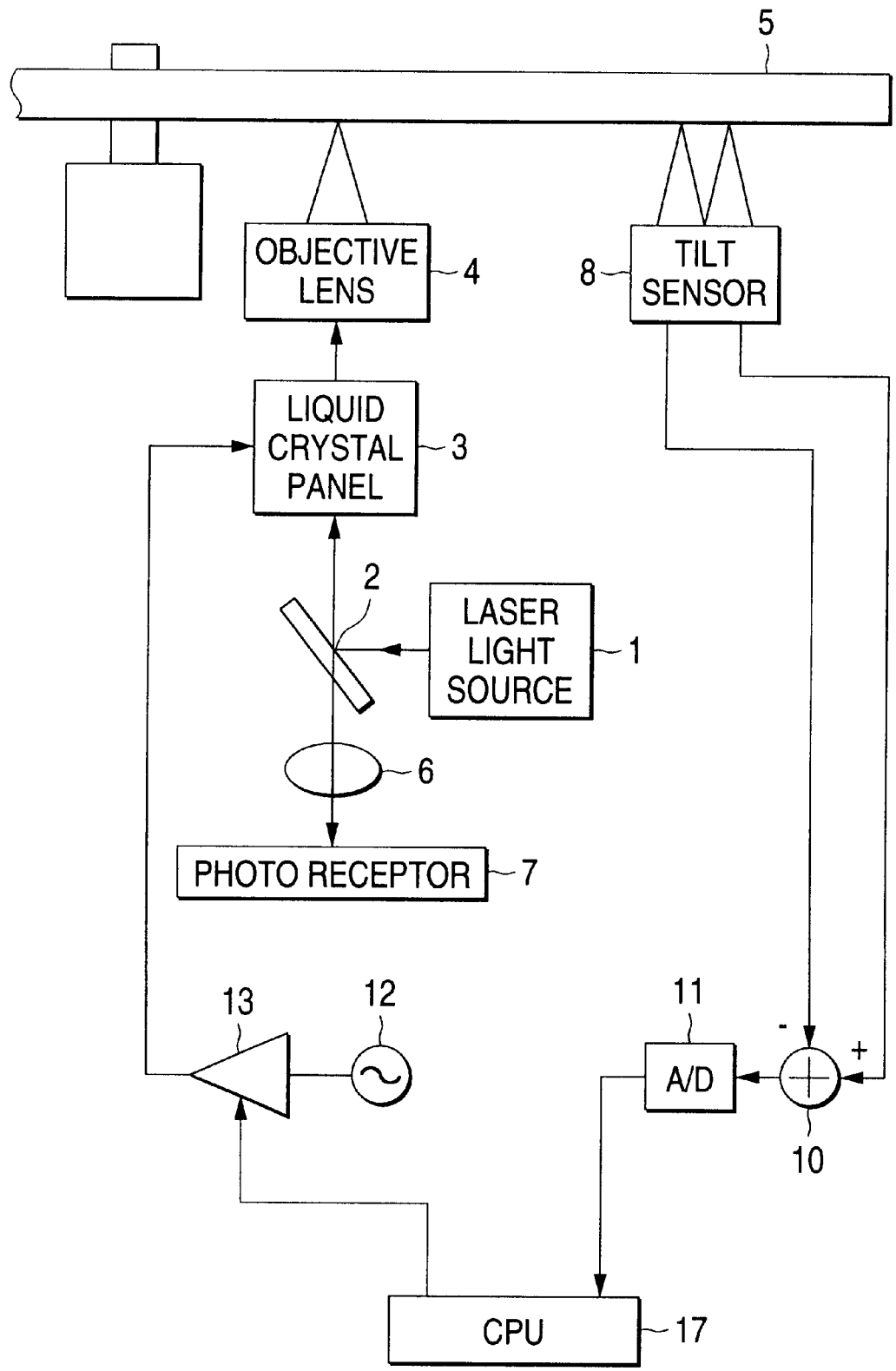
FIG. 8 is a diagram showing an arrangement of an optical disk reproducing apparatus with a conventional liquid crystal driving signal generating apparatus.
Figure 9A:
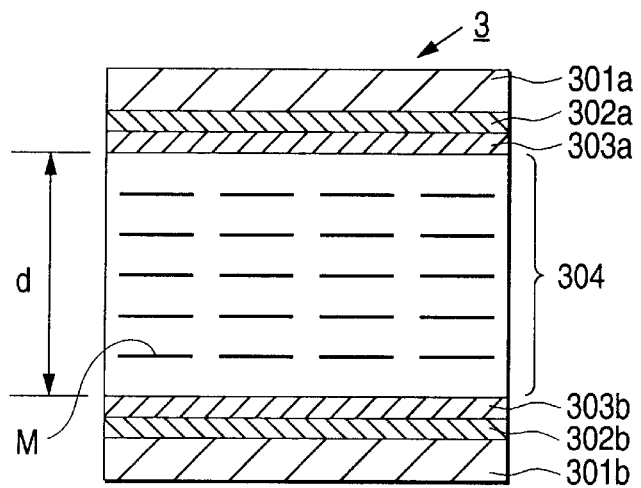
FIGS. 9A and 9B are diagrams showing an example of configuration of a liquid crystal.
Figure 9B:
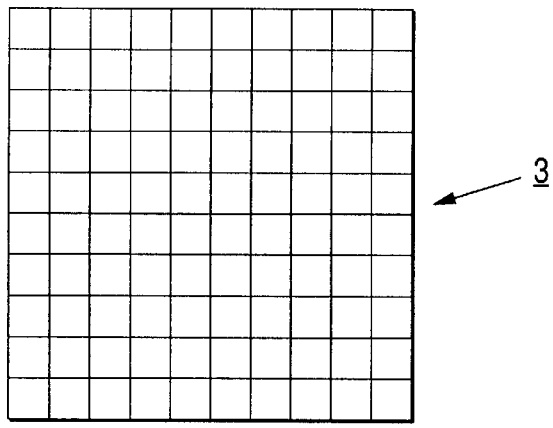
Figure 10:
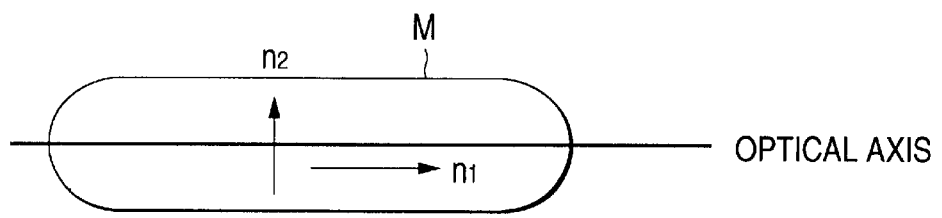
FIG. 10 is a diagram showing a relation between a refractive index of liquid crystal molecule and the optical axis.
Figure 11A:
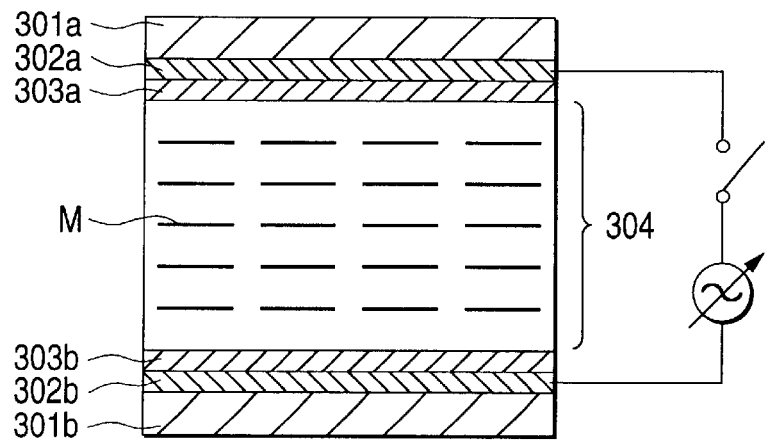
FIGS. 11A to 11C are diagrams showing change in orientation of liquid crystal depending on voltage applied thereto.
Figure 11B:
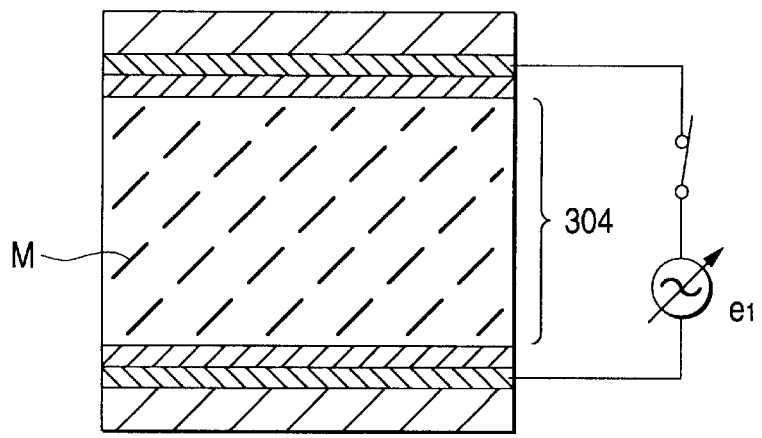
Figure 11C:
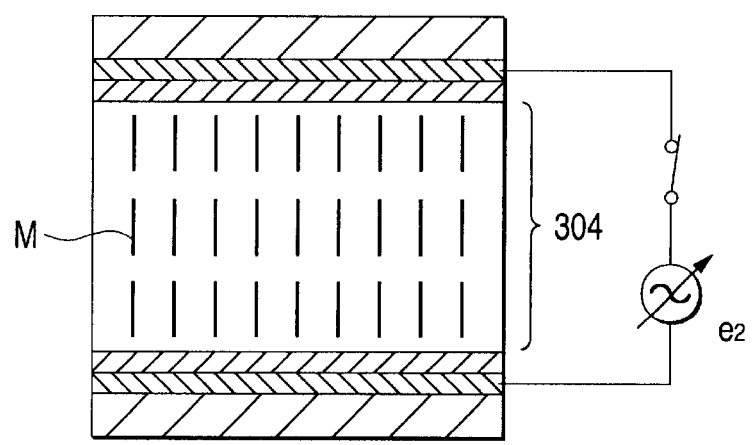

FIG. 1 is a diagram showing schematic arrangement of an optical disk reproducing apparatus with a liquid crystal driving signal generating apparatus according to the present invention. In the figure, parts similar to those of FIG. 8 are marked with the same reference numerals and the detailed explanation thereof is omitted. Thus, the following explanation will be made mainly as to a liquid crystal driving signal generating apparatus 14.

The liquid crystal driving signal generating apparatus 14 includes a pulse width modulation (PWM) signal generator 102 and a filter 103.

In FIG. 1, the CPU 17 is connected to the PWM signal generator 102 so as to be able to control the duty ratio of the output signal of the PWM signal generator 102.

The output signal of the PWM signal generator 102 is supplied to the liquid crystal panel 3 through the filter 103 serving as a low pass filter.

Figure 2:
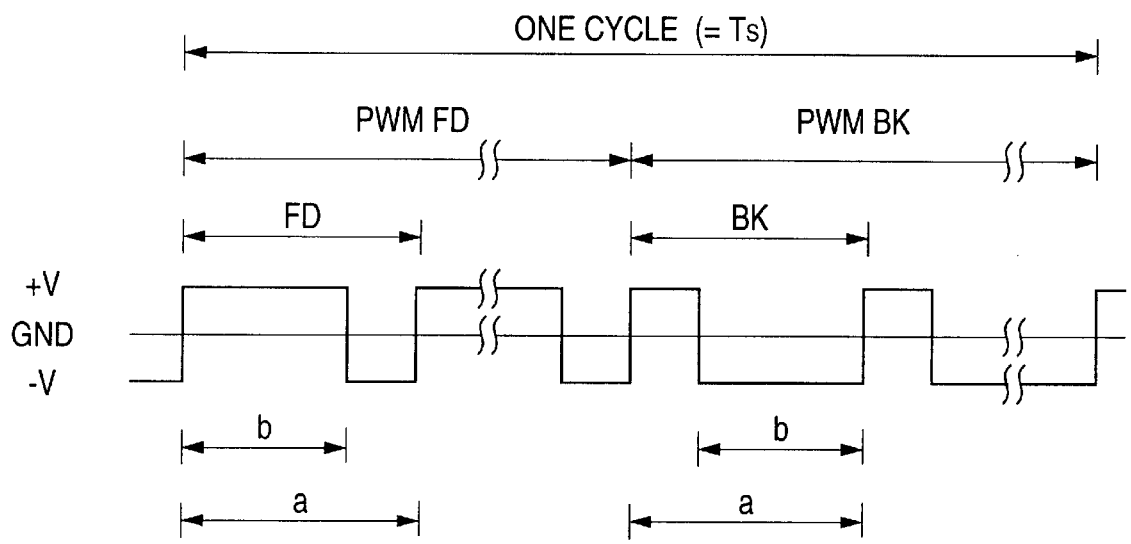
FIG. 2 is a waveform diagram showing an example of the output waveform of the PWM signal generator 102.

FIG. 2 is a diagram showing the output waveform of the PWM signal generator 102. In the present invention, a combination of two kinds of PWM signals is defined as one cycle.

The one cycle is formed by a former half portion (PWM FD) and a latter half portion (PWM BK).

In this case, the duty ratio FD (%) of the PWM signal FD forming the former half portion can be defined by the following expression.

$$FD(\%) = b \times 100/a$$

The duty ratio BK (%) of the PWM signal BK forming the latter half portion can be defined by the following expression.

$$BK\ (\%)=(a-b)\times 100/a=100-FD$$

Accordingly, the driving signal having no DC component can be generated by generating a given number (m) of the PWM signal FDs and the same number of the PWM signal BKs. The liquid crystal has such a property that it is destroyed when applied with a DC component. Thus, the present invention suppresses the generation of the DC component by setting the PWM signal in the aforesaid manner. In the aforesaid explanation, m represents a positive integer.

Figure 3:
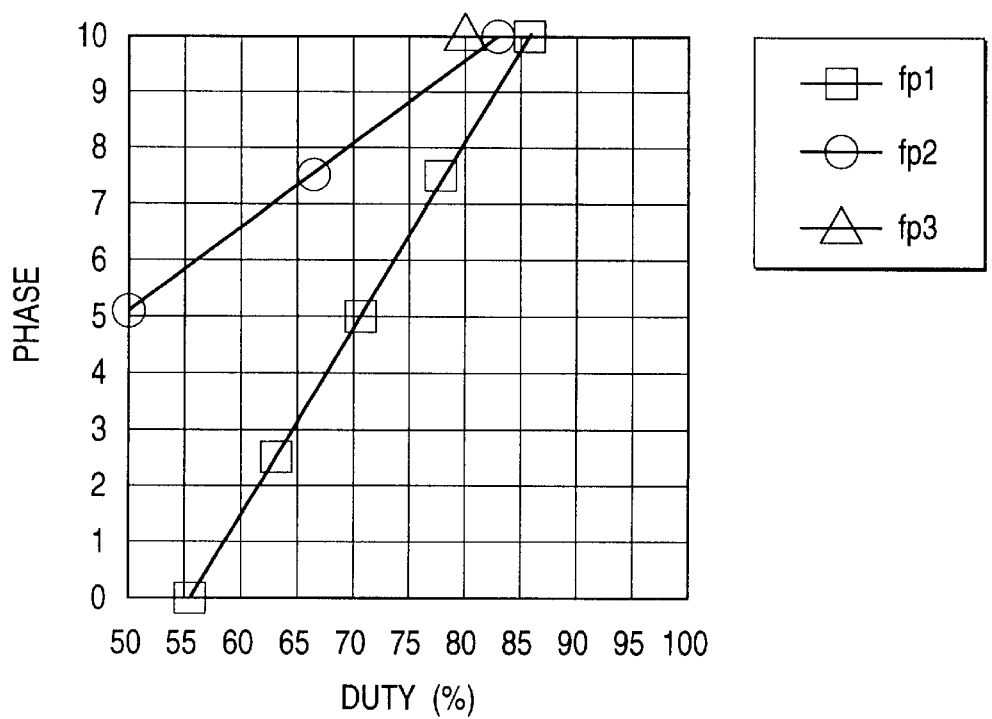
FIG. 3 is a diagram showing the relation between the duty ratio and the phase difference when the period of the PWM signal is changed.

Explanation will be made as to the filter 103. FIG. 3 is a graph showing the relation between a duty ratio and a phase difference of the liquid crystal in a case where the cut-off frequency fc of the low pass filter and the period Ts (=1/fs) of the aforesaid one cycle are fixed and when the frequencies fp defined by the period a (=1/fp) of the PWM signal FD (BK) are set to be fp1, fp2, fp3.

In the figure, the duty ratio on the abscissa is defined as b×100/a (%) on the basis of the waveform diagram shown in FIG. 2.

For example, when the duty ratio of the PWM signal FD is 75(%) and the duty ratio of the PWM signal BK is 25(%), the duty ratio in the figure is defined as 75(%). In contrast, when the duty ratio of the PWM signal FD is 25(%) and the duty ratio of the PWM signal BK is 75(%), the duty ratio in the figure is also defined as 75(%) because this case is same in a view point of one cycle as the case where the duty ratio of the PWM signal FD is 75(%) and the duty ratio of the PWM signal BK is 25(%).

Thus, the duty ratio in the figure is represented only within a range of 50 to 100(%).

The phase difference on the ordinate is obtained by the aforesaid expression $\Delta n \times d \times (2\pi/\lambda)$. The relation among the respective frequencies is fs<fp3<fc=fp2<fp1.

As clear from the figure, when the frequency fp of the PWM signal FD (BK) is equal to or lower than the cut-off frequency fc of the low pass filter (that is, the cases of fp2, fp3), the liquid crystal is driven by the frequency component of the fp even if the duty ratio is 50 (%). This is because the frequency component of the fp attenuates little.

As a consequence, it is difficult to obtain the change characteristics of the wide range and also impossible to set the phase difference to zero.

Accordingly, it is desired to set the fp sufficiently higher than the fc.

Figure 4:
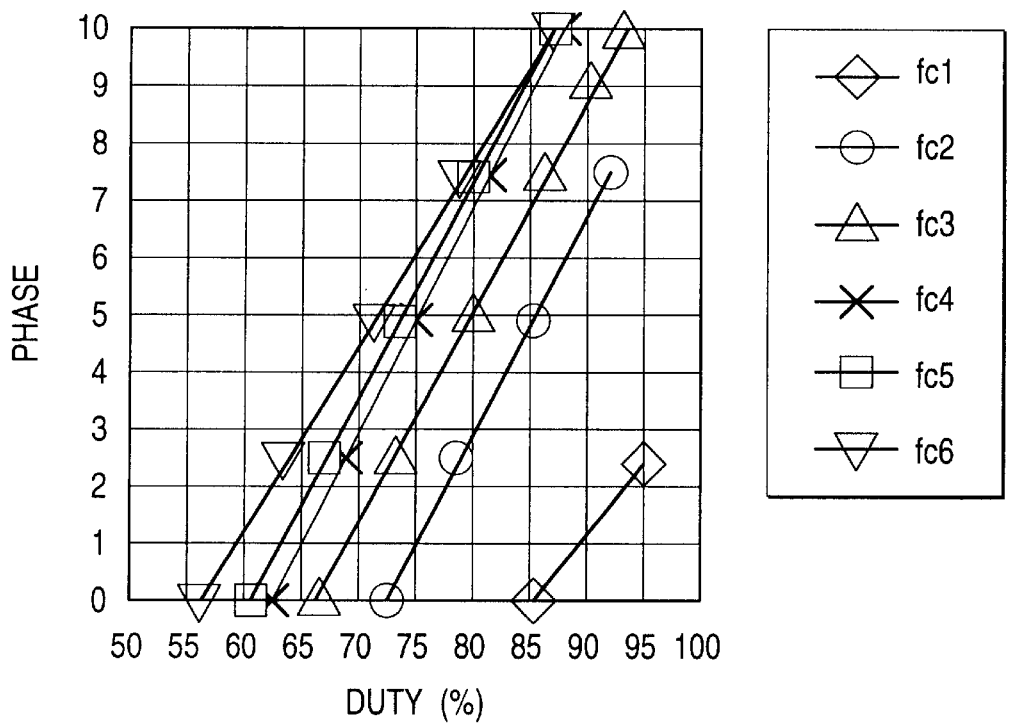
FIG. 4 is a diagram showing the relation between the duty ratio and the phase difference when the cut-off frequency of the filter is changed.

FIG. 4 is a graph showing the relation between a duty ratio and a phase difference of the liquid crystal in a case where the frequency fp of the PWM signal FD (BK) and frequency fs of the one cycle are fixed and when the cut-off frequencies fc of the low pass filter are set to be fc1 to fc6.

The relation among the respective frequencies is set as follows.

$$fc1<fc2=fs<fc3<fc4<fc5<fc6<fp$$

As clear from the figure, when the cut-off frequency fc is equal to or lower than the frequency fs of the one cycle (that is, the cases of fc1, fc2), an amount of the phase difference to be changeable is small. This means that since the fs component as well as the fp component are limited by the filter, the maximum amplitude of the driving signal affecting the phase difference is influenced.

Accordingly, it is desired to set the fc higher than the fs.

As a consequence, the cut-off frequency fc of the filter is required to be set to satisfy the relation fs<fc<<fp.

It is not desirable to make the period Ts of the one cycle too long. This is because such a matter results in almost the same situation as the case where the DC voltage is applied to the liquid crystal and may destroy the liquid crystal.

In contrast, when the period Ts of the one cycle is made too short, it is required to make one period (time period of a) of the PWM signal shorter in accordance with the period Ts. Accordingly, the one period of the PWM signal may not be made shorter in accordance with the oscillation frequency fp depending on the kind of the PWM signal generator to be used.

Therefore, it is desirable to set the fs and fp in view of the aforesaid both conditions and to set the cut-off frequency fc of the filter so as to satisfy the relation fs<fc<<fp.

Figure 5:
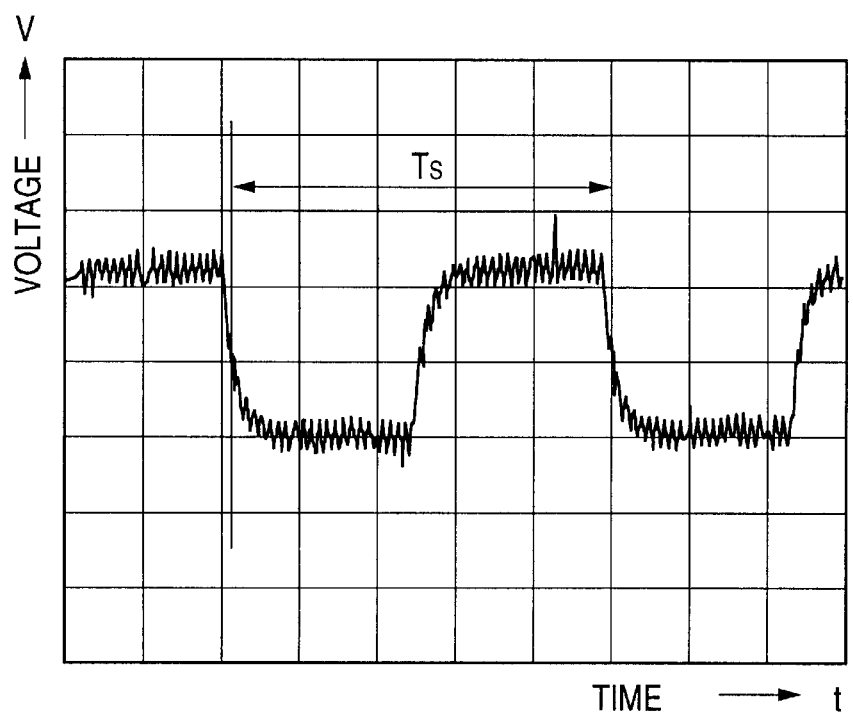
FIG. 5 is a diagram showing an example of the output waveform of the filter.

FIG. 5 is a diagram showing an example of the output waveform of the filter when the respective frequencies are set so as to satisfy the aforesaid relation.

In this case, the duty ratio is 75(%). When the duty ratio is 75(%), since the signals of the frequencies fp and fs are inputted into the filter, it will be understood that the fp component attenuated by the filter and the fs component having not attenuated by the filter are outputted.

Figure 6:
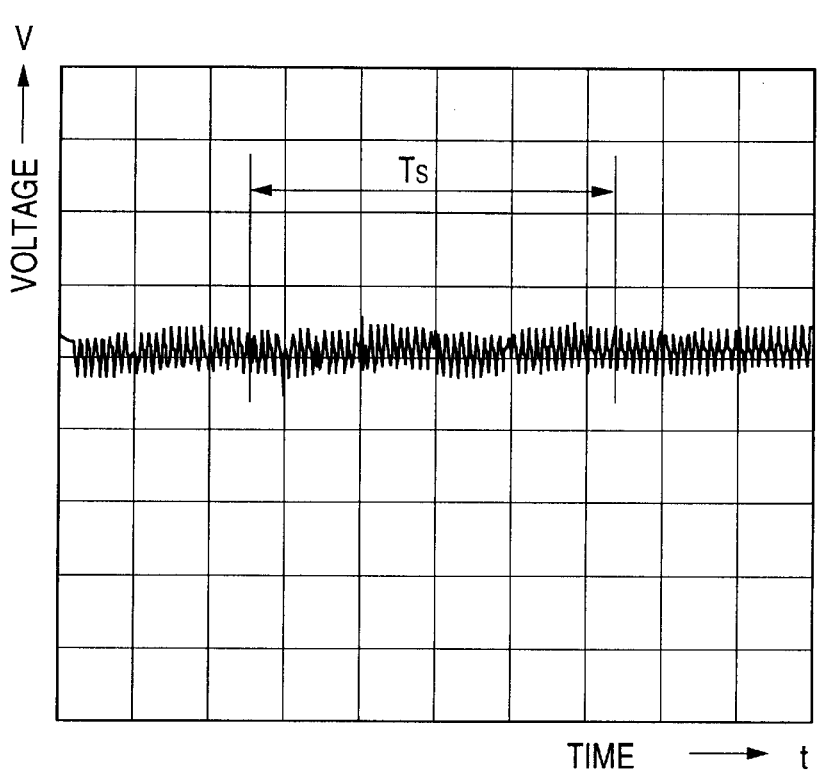
FIG. 6 is a diagram showing an example of the output waveform of the filter.

FIG. 6 is a diagram showing the output waveform of the filter when the duty ratio is set to be 50(%) under the same condition as the above case. When the duty ratio is 50(%), since the signal of the frequency fp is inputted into the filter, it will be understood that the fp component attenuated by the filter is outputted.

Figure 7:
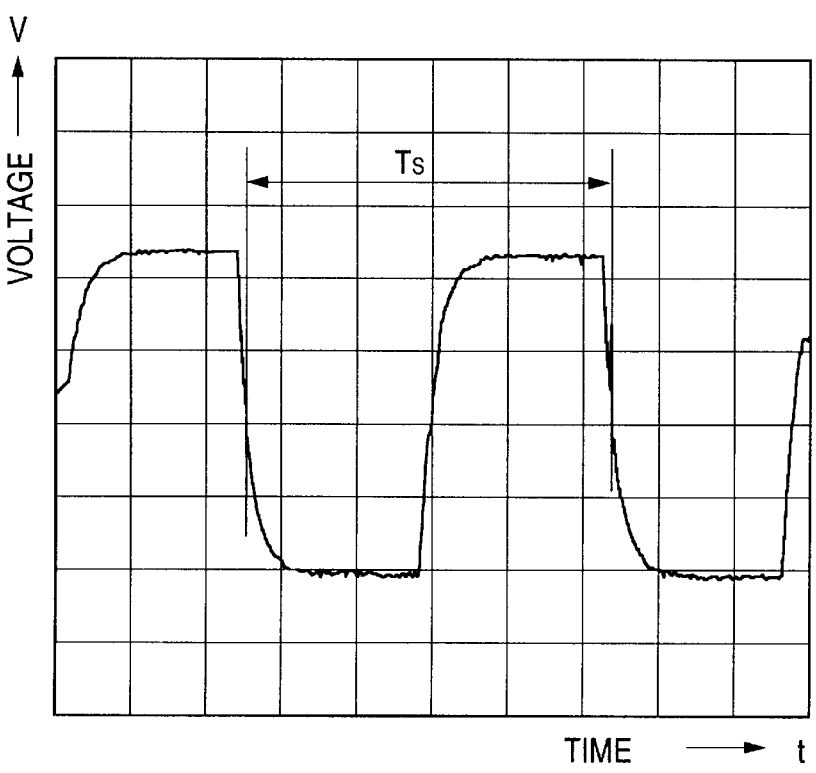
FIG. 7 is a diagram showing an example of the output waveform of the filter.

Further, FIG. 7 is a diagram showing the output waveform of the filter when the duty ratio is set to be 100(%) under the same condition as the above case. When the duty ratio is 100(%), the driving signal of the maximum amplitude is applied to the filter. Thus, since the signal of the frequency fs is inputted into the filter, it will be understood that the fs component having not attenuated by the filter is outputted.

As described above, since the PWM signal generator 102 and the low pass filter 103 are used in this manner, the voltage amplitude of the driving signal for driving the liquid crystal can be suitably changed.

Further, since the driving signal having symmetrical amplitude with respect to the reference voltage can be obtained, the deterioration (destroy) of the liquid crystal due to the DC component can be suppressed.

In the aforesaid embodiment, the output of the filter 103 is directly inputted into the liquid crystal 103. However, when the amplitude range of the output signal of the PWM signal generator 102 is small, it is possible to adjust the total gain of the driving signal by disposing an amplifier with a fixed amplification degree at the front or rear stage of the filter 103.

In recent years, there is proposed a CPU incorporating the PWM signal generator 102 therein. When employing such a CPU, the amplitude range of the PWM signal is varied depending on the operation voltage of the CPU. In such a case, it is required to secure the dynamic range necessary for driving the liquid crystal by adding an amplifier with a fixed amplification degree as described above.

As described above, according to the present invention, since the duty ratio of the PWM signal generated by the PWM signal generator is controlled, the voltage amplitude of the driving signal applied to the liquid crystal can be suitably set.

Further, at the time of outputting the PWM signal, the PWM signal is controlled so as to suppress the generation of the DC component, such a problem can be suppressed that the characteristics of the liquid crystal is degraded and the liquid crystal is destroyed.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A liquid crystal driving signal generating apparatus comprising:

a PWM signal generator that generates a PWM signal; and a control circuit that controls said PWM signal generator to generate a PWM signal in which at least two types of duty ratios corresponding to a refractive index to be set in a liquid crystal are combined, wherein said refractive index corrects aberration caused by a tilt angle of a disk.

2. A liquid crystal driving signal generating apparatus according to claim 1, wherein said PWM signal is formed by a first PWM signal with a duty ratio of N (%) and a second PWM signal with a duty ratio of 100-N (%).

3. A liquid crystal driving signal generating apparatus according to claim 2, wherein said PWM signal generates a signal formed by the repetition of a unit cycle which includes m (m is an integer one or more) successive ones of said first PWM signals and said m (m is an integer one or more) successive ones of said second PWM signals.

4. A liquid crystal driving signal generating apparatus according to claim 3, further comprising:

a low pass filter for limiting a frequency band of said PWM signal output from said PWM signal generator, wherein a cut-off frequency of said low pass filter is set to be lower than a frequency defined by a generation period of said second PWM signal.

5. A liquid crystal driving signal generating apparatus according to claim 4, wherein a cut-off frequency of said low pass filter is set to be higher than a frequency defined by said unit cycle of said PWM signal.

6. A liquid crystal driving signal generating apparatus according to claim 2, further comprising:

a low pass filter for limiting a frequency band of said PWM signal output from said PWM signal generator, wherein a cut-off frequency of said low pass filter is set to be lower than a frequency defined by a generation period of said first PWM signal.

7. An optical disk reproducing apparatus with a liquid crystal driving signal generating apparatus, comprising:

a liquid crystal panel disposed between a light source and an objective lens;

a PWM signal generator that generates a PWM signal;

a detector that detects a tilt angle of a disk; and a controller that determines a refractive index to be set in said liquid crystal panel for correcting wave surface aberration caused by the tilt angle, and that controls said PWM signal generator such that said PWM signal generator generates a PWM signal in which at least two types of duty ratios corresponding to the refractive index are combined.

8. An apparatus, comprising:

a pulse width modulation ("PWM") signal generator that generates a PWM signal;

a liquid crystal that is driven by said PWM signal;

a controller that receives information corresponding to a refractive index to be set in said liquid crystal and instructs said PWM signal generator to generate said PWM signal based on said information, wherein said PWM signal comprises a first signal portion having a first duty ratio and comprises a second signal portion having a second duty ratio, wherein said first duty ratio and said second duty ratio are different from each other, and wherein said refractive index corrects aberration caused by a tilt angle of a disk.

9. The apparatus as claimed in claim 8, wherein said first duty ratio and said second duty ratio respectively have values that reduce a direct current component in said PWM signal to substantially zero.

10. The apparatus as claimed in claim 8, wherein said first signal portion of said PWM signal has a plurality of pulses and wherein said second signal portion of said PWM signal has a plurality of pulses.

11. The apparatus as claimed in claim 10, wherein a number of said pulses of said first signal portion equals a number of said pulses of said second signal portion.

12. The apparatus as claimed in claim 10, wherein said first duty ratio equals N % and said second duty ratio equals (100-N) %.

13. The apparatus as claimed in claim 8, wherein said first signal portion of said PWM signal oscillates between a first value and a second value, and wherein said second signal portion of said PWM signal oscillates between a third value and a fourth value.

14. The apparatus as claimed in claim 13, wherein said first value substantially equals said third value, and wherein said second value substantially equals said fourth value.

15. The apparatus as claimed in claim 14, wherein said first duty ratio equals N % and said second duty ratio equals (100-N) %.

16. The apparatus as claimed in claim 8, wherein said first duty ratio equals N % and said second duty ratio equals (100-N) %.

17. A liquid crystal driving signal generating apparatus comprising:

a PWM signal generator that generates a PWM signal; and a control circuit that controls said PWM signal generator to generate a PWM signal in which at least two types of duty ratios corresponding to a refractive index to be set in a liquid crystal are combined, wherein said PWM signal is formed by a first PWM signal with a duty ratio of N (%) and a second PWM signal with a duty ratio of 100-N (%), and wherein N is greater than zero and less than 100.

18. A liquid crystal driving signal generating apparatus according to claim 17, wherein said PWM signal generator generates a signal formed by the repetition of a unit cycle which includes m (m is an integer one or more) successive ones of said first PWM signals and said m (m is an integer one or more) successive ones of said second PWM signals.

19. A liquid crystal driving signal generating apparatus according to claim 18, further comprising:

a low pass filter for limiting a frequency band of said PWM signal output from said PWM signal generator, wherein a cut-off frequency of said low pass filter is set to be lower than a frequency defined by a generation period of said second PWM signal.

20. A liquid crystal driving signal generating apparatus according to claim 19, wherein a cut-off frequency of said low pass filter is set to be higher than a frequency defined by said unit cycle of said PWM signal.

21. A liquid crystal driving signal generating apparatus according to claim 17, further comprising:
a low pass filter for limiting a frequency band of said PWM signal output from said PWM signal generator,
wherein a cut-off frequency of said low pass filter is set to be lower than a frequency defined by a generation period of said first PWM signal.

22. A liquid crystal driving signal generating apparatus according to claim 17, further comprising:
a low pass filter for limiting a frequency band of said PWM signal output from said PWM signal generator,
wherein a cut-off frequency of said low pass filter is set to be lower than a frequency defined by a generation period of said second PWM signal.

23. An optical disk reproducing apparatus with a liquid crystal driving signal generating apparatus, comprising:
a liquid crystal panel disposed between a light source and an objective lens;
a PWM signal generator that generates a PWM signal;
a detector that detects a tilt angle of a disk; and
a controller that determines a refractive index to be set in said liquid crystal panel for correcting wave surface aberration caused by the tilt angle, and that controls said PWM signal generator such that said PWM signal generator generates a PWM signal in which at least two types of duty ratios corresponding to the refractive index are combined,
wherein said PWM signal is formed by a first PWM signal with a duty ratio of N (%) and a second PWM signal with a duty ratio of 100-N (%), and
wherein N is greater than zero and less than 100.

24. An apparatus, comprising:
a pulse width modulation ("PWM") signal generator that generates a PWM signal;
a liquid crystal that is driven by said PWM signal;
a controller that receives information corresponding to a refractive index to be set in said liquid crystal and instructs said PWM signal generator to generate said PWM signal based on said information,
wherein said PWM signal comprises a first signal portion having a first duty ratio and comprises a second signal portion having a second duty ratio,
wherein said first duty ratio equals N(%) and said second duty ratio equals 100-N(%),
wherein said first duty ratio and said second duty ratio are different from each other, and
wherein N is greater than zero and less than 100.

25. The apparatus as claimed in claim 24, wherein said first duty ratio and said second duty ratio respectively have values that reduce a direct current component in said PWM signal to substantially zero.

26. The apparatus as claimed in claim 24, wherein said first signal portion of said PWM signal has a plurality of pulses and wherein said second signal portion of said PWM signal has a plurality of pulses.

27. The apparatus as claimed in claim 26, wherein a number of said pulses of said first signal portion equals a number of said pulses of said second signal portion.

28. The apparatus as claimed in claim 24, wherein said first signal portion of said PWM signal oscillates between a first value and a second value, and
wherein said second signal portion of said PWM signal oscillates between a third value and a fourth value.

29. The apparatus as claimed in claim 28, wherein said first value substantially equals said third value, and wherein said second value substantially equals said fourth value.

30. A liquid crystal driving signal generating apparatus comprising:
a PWM signal generator that generates a PWM signal; and
a control circuit that controls said PWM signal generator to generate a PWM signal in which at least two types of duty ratios corresponding to a refractive index to be set in a liquid crystal are combined,
wherein said PWM signal is formed by a first PWM signal with a duty ratio of N(%) and a second PWM signal with a duty ratio of 100-N (%), and
wherein said first PWM signal constitutes a first half of one cycle of said PWM signal and said second PWM signal constitutes a second half of said one cycle of said PWM signal.

31. A liquid crystal driving signal generating apparatus according to claim 30, further comprising:
a low pass filter for limiting a frequency band of said PWM signal output from said PWM signal generator,
wherein a cut-off frequency of said low pass filter is set to be lower than a frequency defined by a generation period of said first PWM signal.

32. A liquid crystal driving signal generating apparatus according to claim 31, wherein a cut-off frequency of said low pass filter is set to be higher than a frequency defined by said unit cycle of said PWM signal.

33. A liquid crystal driving signal generating apparatus according to claim 32, further comprising:
a low pass filter for limiting a frequency band of said PWM signal output from said PWM signal generator,
wherein a cut-off frequency of said low pass filter is set to be lower than a frequency defined by a generation period of said second PWM signal.

34. An optical disk reproducing apparatus with a liquid crystal driving signal generating apparatus, comprising:
a liquid crystal panel disposed between a light source and an objective lens;
a PWM signal generator that generates a PWM signal;
a detector that detects a tilt angle of a disk; and
a controller that determines a refractive index to be set in said liquid crystal panel for correcting wave surface aberration caused by the tilt angle, and that controls said PWM signal generator such that said PWM signal generates a PWM signal in which at least two types of duty ratios corresponding to the refractive index are combined,
wherein said PWM signal is formed by a first PWM signal with a duty ratio of N (%) and a second PWM signal with a duty ratio of 100-N (%), and
wherein said first PWM signal constitutes a first half of one cycle of said PWM signal and said second PWM signal constitutes a second half of said one cycle of said PWM signal.

35. An apparatus, comprising:
a pulse width modulation ("PWM") signal generator that generates a PWM signal;
a liquid crystal that is driven by said PWM signal;
a controller that receives information corresponding to a refractive index to be set in said liquid crystal and instructs said PWM signal generator to generate said PWM signal based on said information,
wherein said PWM signal comprises a first signal portion having a first duty ratio that equals N(%) and comprises a second signal portion having a second duty ratio that equals 100-N (%), wherein said first duty ratio and said second duty ratio are different from each other, and wherein said first signal portion constitutes a first half of one cycle of said PWM signal and said second signal portion constitutes a second half of said one cycle of said PWM signal.

36. The apparatus as claimed in claim 35, wherein said first duty ratio and said second duty ratio respectively have values that reduce a direct current component in said PWM signal to substantially zero.

37. The apparatus as claimed in claim 35, wherein said first signal portion of said PWM signal has a plurality of pulses and wherein said second signal portion of said PWM signal has a plurality of pulses.

38. The apparatus as claimed in claim 37, wherein a number of said pulses of said first signal portion equals a number of said pulses of said second signal portion.

39. The apparatus as claimed in claim 35, wherein said first signal portion of said PWM signal oscillates between a first value and a second value, and wherein second signal portion of said PWM signal oscillates between a third value and a fourth value.

40. The apparatus as claimed in claim 39, wherein said first value substantially equals said third value, and wherein said second value substantially equals said fourth value.

41. A liquid crystal driving signal generating apparatus comprising:

a PWM signal generator that generates a PWM signal; and a control circuit that controls said PWM signal generator to generate a PWM signal in which at least two types of duty ratios corresponding to a refractive index to be set in a liquid crystal are combined, wherein said PWM signal is formed by a first PWM signal with a duty ratio of N (%) and a second PWM signal with a duty ratio of 100-N (%), and wherein said duty ratio of said first PWM signal and said duty ratio of said second PWM signal have values that reduce a direct current component in said PWM signal to substantially zero.

42. A liquid crystal driving signal generating apparatus according to claim 41, wherein said PWM signal generator generates a signal formed by the repetition of a unit cycle which includes m (m is an integer one or more) successive ones of said first PWM signals and said m (m is an integer one or more) successive ones of said second PWM signals.

43. A liquid crystal driving signal generating apparatus according to claim 41, further comprising:

a low pass filter for limiting a frequency band of said PWM signal output from said PWM signal generator, wherein a cut-off frequency of said low pass filter is set to be lower than a frequency defined by a generation period of said first PWM signal.

44. A liquid crystal driving signal generating apparatus according to claim 43, wherein a cut-off frequency of said low pass filter is set to be higher than a frequency defined by said unit cycle of said PWM signal.

45. A liquid crystal driving signal generating apparatus according to claim 43, further comprising:

a low pass filter for limiting a frequency band of said PWM signal output from said PWM signal generator, wherein a cut-off frequency of said low pass filter is set to be lower than a frequency defined by a generation period of said second PWM signal.

46. An optical disk reproducing apparatus with a liquid crystal driving signal generating apparatus, comprising:

a liquid crystal panel disposed between a light source and an objective lens;

a PWM signal generator that generates a PWM signal;

a detector that detects a tilt angle of a disk; and a controller that determines a refractive index to be set in said liquid crystal panel for correcting wave surface aberration caused by the tilt angle, and that controls said PWM signal generator such that said PWM signal generator generates a PWM signal in which at least two types of duty ratios corresponding to the refractive index are combined, wherein said PWM signal is formed by a first PWM signal with a duty ratio of N (%) and a second PWM signal with a duty ratio of 100-N (%), and wherein said duty ratio of said first PWM signal and said duty ratio of said second PWM signal have values that reduce a direct current component in said PWM signal to substantially zero.

47. An apparatus, comprising:

a pulse width modulation ("PWM") signal generator that generates a PWM signal;

a liquid crystal that is driven by said PWM signal;

a controller that receives information corresponding to a refractive index to be set in said liquid crystal and instructs said PWM signal generator to generate said PWM signal based on said information, wherein said PWM signal comprises a first signal portion having a first duty ratio that equals N(%) and comprises a second signal portion having a second duty ratio that equals 100-N (%), wherein said first duty ratio and said second duty ratio are different from each other, and wherein said first duty ratio and said second duty ratio have values that reduce a direct current component in said PWM signal to substantially zero.

48. The apparatus as claimed in claim 47, wherein said first signal portion of said PWM signal has a plurality of pulses and wherein said second signal portion of said PWM signal has a plurality of pulses.

49. The apparatus as claimed in claim 48, wherein a number of said pulses of said first signal portion equals a number of said pulses of said second signal portion.

50. The apparatus as claimed in claim 47, wherein said first signal portion of said PWM signal oscillates between a first value and a second value, and wherein said second signal portion of said PWM signal oscillates between a third value and a fourth value.

51. The apparatus as claimed in claim 50, wherein said first value substantially equals said third value, and wherein said second value substantially equals said fourth value.

* * * * *